(12) United States Patent
Mitchell

(10) Patent No.: US 10,173,156 B2
(45) Date of Patent: Jan. 8, 2019

(54) FILTER CARTRIDGE

(71) Applicant: General Electric Company, Schenectady, NY (US)

(72) Inventor: Alan Joseph Mitchell, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 265 days.

(21) Appl. No.: 15/067,270

(22) Filed: Mar. 11, 2016

(65) Prior Publication Data

US 2017/0259195 A1  Sep. 14, 2017

(51) Int. Cl.
| | |
|---|---|
| *B01D 35/30* | (2006.01) |
| *C02F 1/28* | (2006.01) |
| *B01D 39/20* | (2006.01) |
| *F25D 23/12* | (2006.01) |

(52) U.S. Cl.
CPC .............. *B01D 35/30* (2013.01); *C02F 1/283* (2013.01); *B01D 39/2062* (2013.01); *B01D 2201/303* (2013.01); *B01D 2201/347* (2013.01); *B01D 2201/4007* (2013.01); *B01D 2201/4015* (2013.01); *C02F 2201/006* (2013.01); *C02F 2307/12* (2013.01); *F25D 23/126* (2013.01); *F25D 2323/121* (2013.01)

(58) Field of Classification Search
CPC .................. C02F 1/283; C02F 2307/12; C02F 2201/006; B01D 35/30; B01D 29/2062; B01D 35/1573; B01D 2201/303; B01D 2201/4007; B01D 2201/4015; F25D 2323/121

See application file for complete search history.

(56) References Cited

U.S. PATENT DOCUMENTS

| | | | |
|---|---|---|---|
| 6,120,685 A * | 9/2000 | Carlson ................ | B01D 35/143 210/232 |
| 6,579,455 B1 * | 6/2003 | Muzik ................... | B01D 27/06 210/234 |
| 7,387,725 B2 | 6/2008 | Choi et al. | |
| 7,407,148 B2 | 8/2008 | Bassett et al. | |
| 2006/0091047 A1 * | 5/2006 | Ye ...................... | B01D 21/0012 210/109 |
| 2006/0272995 A1 | 12/2006 | Fritze | |
| 2008/0185330 A1 * | 8/2008 | Sinur ..................... | B01D 29/96 210/238 |
| 2013/0334116 A1 * | 12/2013 | Stanley .................. | C02F 1/003 210/198.1 |
| 2014/0353235 A1 | 12/2014 | Sherman et al. | |

\* cited by examiner

*Primary Examiner* — Matthew O Savage

(74) *Attorney, Agent, or Firm* — Dority & Manning, P.A.

(57) ABSTRACT

A filter cartridge includes a casing. A filter medium is disposed within the casing. A female inlet port and a female outlet port are mounted to the casing at an end portion of the casing. The female inlet port is offset from the female outlet port along the radial direction at the end portion of the casing.

19 Claims, 11 Drawing Sheets

FILTER CARTRIDGE

FIELD OF THE INVENTION

The present subject matter relates generally to filter cartridges, such as filter cartridges for refrigerator appliances.

BACKGROUND OF THE INVENTION

Water filters are generally divided into two classes: point of entry water filters and point of use water filters. Point of use water filters can be installed at a kitchen sink or within a refrigerator appliance in order to filter water entering such devices. In order to filter water, water filters are generally provided with a filtering media, such as a block of activated carbon. The water filter's filtering media can adsorb or remove contaminants such as chlorine and lead from water prior to delivering such water to a user. For example, the water filter can filter water prior to such water entering the refrigerator's ice maker or water dispenser.

The block of activated carbon has pores that permit a flow of water through the block. By passing through the pores, contaminants such as sand, rust, and cysts within the flow of water can be mechanically filtered out of the water. Similarly, volatile organic compounds such as chloroform, lindane, and atrazine can be adsorbed into pore surfaces as water moves through the carbon block. However, the filtering capacity of the filtering media can decrease over time due to pores becoming clogged or pore surfaces become saturated with contaminates. Also, conditions within the filtering media can provide for large scale bacteria growth, particularly over time. For example, bacteria can start to grow within the carbon block given the right water conditions and sufficient time.

To hinder such bacteria growth and insure that the filtering media has not exceeded its filtering capacity, the water filter is preferably replaced or serviced about every six months regardless of its current performance. However, changing the water filter can be a messy and time consuming task. For example, when a filter cartridge is removed from a manifold water can spill from the manifold. To limit spilling, water flow to the manifold can be terminated with a valve, but actuating a valve can be time consuming and inconvenient. Thus, certain consumers only replace the water filter after it has become blocked, e.g., by sediment accumulation around and within the carbon block.

Accordingly, a water cartridge with features for hindering spilling of water during removal or replacement of the filter cartridge would be useful.

BRIEF DESCRIPTION OF THE INVENTION

The present subject matter provides a filter cartridge that includes a casing. A filter medium is disposed within the casing. A female inlet port and a female outlet port are mounted to the casing at an end portion of the casing. The female inlet port is offset from the female outlet port along the radial direction at the end portion of the casing. Additional aspects and advantages of the invention will be set forth in part in the following description, or may be apparent from the description, or may be learned through practice of the invention.

In a first exemplary embodiment, a filter cartridge is provided. The filter cartridge defines an axial direction and a radial direction that are perpendicular to each other. The filter cartridge includes a casing. A filter medium is disposed within the casing. A female inlet port and a female outlet port are mounted to the casing at an end portion of the casing. The female inlet port is offset from the female outlet port along the radial direction at the end portion of the casing.

In a second exemplary embodiment, a filter cartridge is provided. The filter cartridge defines an axial direction and a radial direction that are perpendicular to each other. The filter cartridge includes a cylindrical casing having a central axis that is parallel to the axial direction. A filter medium is disposed within the cylindrical casing. A female inlet port and a female outlet port are mounted to the casing at an end portion of the casing. The female inlet port and the female outlet port are offset from each other along the radial direction. The female inlet port and the female outlet port are also offset from the central axis of the casing along the radial direction. The female inlet port and the female outlet port are positioned equidistant from the central axis of casing along the radial direction. An outer wall is mounted to the casing at the end portion of the casing. The outer wall extends around the female inlet port and the female outlet port in a plane that is perpendicular to the axial direction. The outer wall, the female inlet port and the female outlet port each define a height along the axial direction. The height of the outer wall is no less than the height of the female inlet port and the height of the female outlet port.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
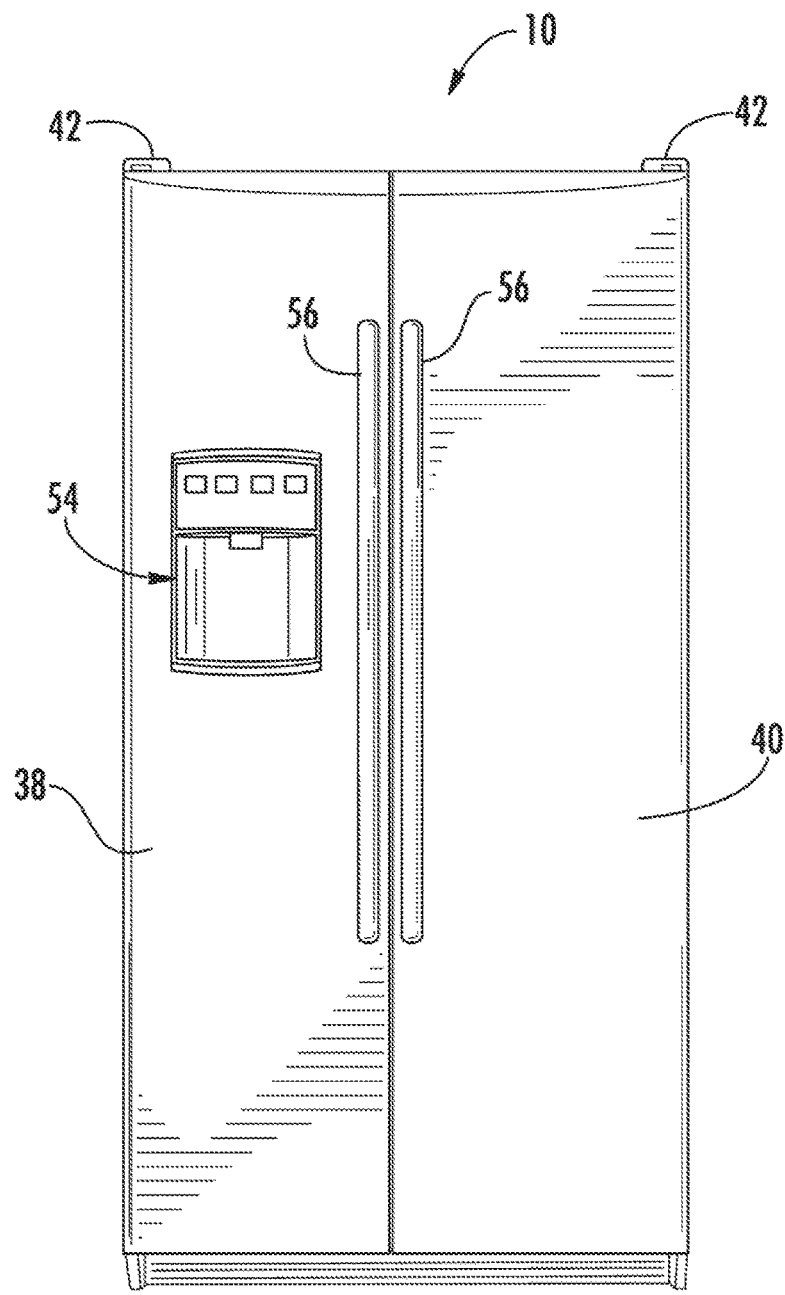
FIG. 1 provides a perspective view of a refrigerator appliance according to an exemplary embodiment of the present subject matter with doors of the exemplary refrigerator appliance shown closed.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of a refrigeration appliance 10 according to an exemplary embodiment of the present subject matter. Refrigerator appliance 10 may include a filter assembly 60 that includes features for facilitating maintenance and/or servicing of filter assembly 60. It should be appreciated that refrigerator appliance 10 is provided for illustrative purposes only and that the present subject matter is not limited to any particular type, style, or configuration of refrigeration appliance, and may be used in or with any manner of refrigerator, freezer, refrigerator/freezer combination, and so forth.

Figure 2:
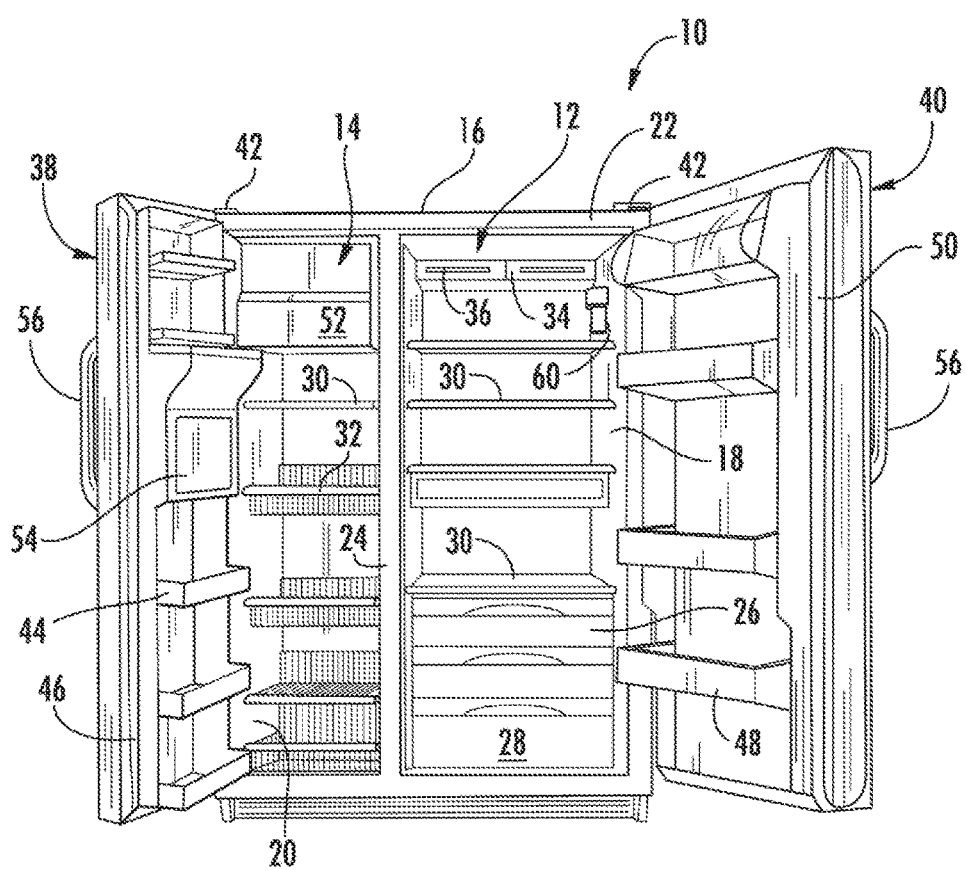
FIG. 2 provides a perspective view of the exemplary refrigerator appliance with doors of the exemplary refrigerator appliance shown open.

Referring to FIG. 2, refrigerator appliance 10 includes a fresh food storage compartment 12 and a freezer storage compartment 14, with the compartments arranged side-by-side and contained within an outer case 16 and inner liners 18 and 20 generally molded from a suitable plastic material. Thus, refrigerator appliance 10 is generally referred to as a side-by-side style refrigerator appliance. In alternative exemplary embodiments, refrigerator appliance 10 may include a single liner and a mullion that spans between opposite sides of the single liner to divide it into freezer storage compartment 14 and fresh food storage compartment 12. Outer case 16 is normally formed by folding a sheet of a suitable material, such as pre-painted steel, into an inverted U-shape to form top and side walls of outer case 16. A bottom wall of outer case 16 normally is formed separately and attached to the case side walls and to a bottom frame that provides support for refrigerator appliance 10.

A breaker strip 22 extends between a case front flange and outer front edges of inner liners 18 and 20. Breaker strip 22 is formed from a suitable resilient material, such as an extruded acrylo-butadiene-styrene based material (commonly referred to as ABS). The insulation in the space between inner liners 18 and 20 is covered by another strip of suitable resilient material, which also commonly is referred to as a mullion 24 and may be formed of an extruded ABS material. Breaker strip 22 and mullion 24 form a front face, and extend completely around inner peripheral edges of outer case 16 and vertically between inner liners 18 and 20.

Slide-out drawers 26, a storage bin 28 and shelves 30 are normally provided in fresh food storage compartment 12 to support items being stored therein. In addition, at least one shelf 30 and at least one wire basket 32 are also provided in freezer storage compartment 14.

Refrigerator appliance features are regulated with a controller 34 according to user preference via manipulation of a control interface 36 mounted in an upper region of fresh food storage compartment 12 and coupled to controller 34. As used herein, the term "controller" is not limited to just those integrated circuits referred to in the art as microprocessor, but broadly refers to computers, processors, microcontrollers, microcomputers, programmable logic controllers, application specific integrated circuits, and other programmable circuits, and these terms are used interchangeably herein.

A freezer door 38 and a fresh food door 40 close access openings to freezer storage compartment 14 and fresh food storage compartment 12. Freezer door and fresh food door 38 and 40 are each mounted by a top hinge 42 and a bottom hinge (not shown) to rotate about its outer vertical edge between an open position, as shown in FIG. 1, and a closed position. Freezer door 38 may include a plurality of storage shelves 44 and a sealing gasket 46, and fresh food door 40 also includes a plurality of storage shelves 48 and a sealing gasket 50.

Freezer storage compartment 14 may include an automatic ice maker 52 and a dispenser 54 provided in freezer door 38 such that ice and/or chilled water can be dispensed without opening freezer door 38, as is well known in the art. Freezer door and fresh food door 38 and 40 may be opened by handles 56.

Refrigerator appliance 10 also includes filter assembly 60 for filtering water coming into refrigerator appliance 10 from a water supply (not shown), such as a municipal water source or a well. Filter assembly 60 can remove contaminants such as chlorine, chloroform, lead, arsenic, pharmaceuticals, microbes, and/or other undesirable substances from water supplied to refrigerator appliance 10. In particular, filter assembly 60 can supply filtered water to ice maker 52 and/or dispenser 54. As will be understood and used herein, the term "water" includes purified water and solutions or mixtures containing water and, e.g., elements (such as calcium, chlorine, and fluorine), salts, bacteria, nitrates, organics, and other chemical compounds or substances.

As with known refrigerators, refrigerator appliance 10 also includes a machinery compartment (not shown) that at least partially contains components for executing a known vapor compression cycle for cooling air. The components include a compressor, a condenser, an expansion device, and an evaporator connected in series as a loop and charged with a refrigerant. The evaporator is a type of heat exchanger which transfers heat from air passing over the evaporator to the refrigerant flowing through the evaporator, thereby causing the refrigerant to vaporize. The cooled air is used to refrigerate one or more refrigerator or freezer compartments via fans. Also, a cooling loop can be added to direct cool the ice maker to form ice cubes, and a heating loop can be added to help remove ice from the ice maker. Collectively, the vapor compression cycle components in a refrigeration circuit, associated fans, and associated compartments are conventionally referred to as a sealed system. The construction and operation of the sealed system are well known to those skilled in the art.

Figure 3:
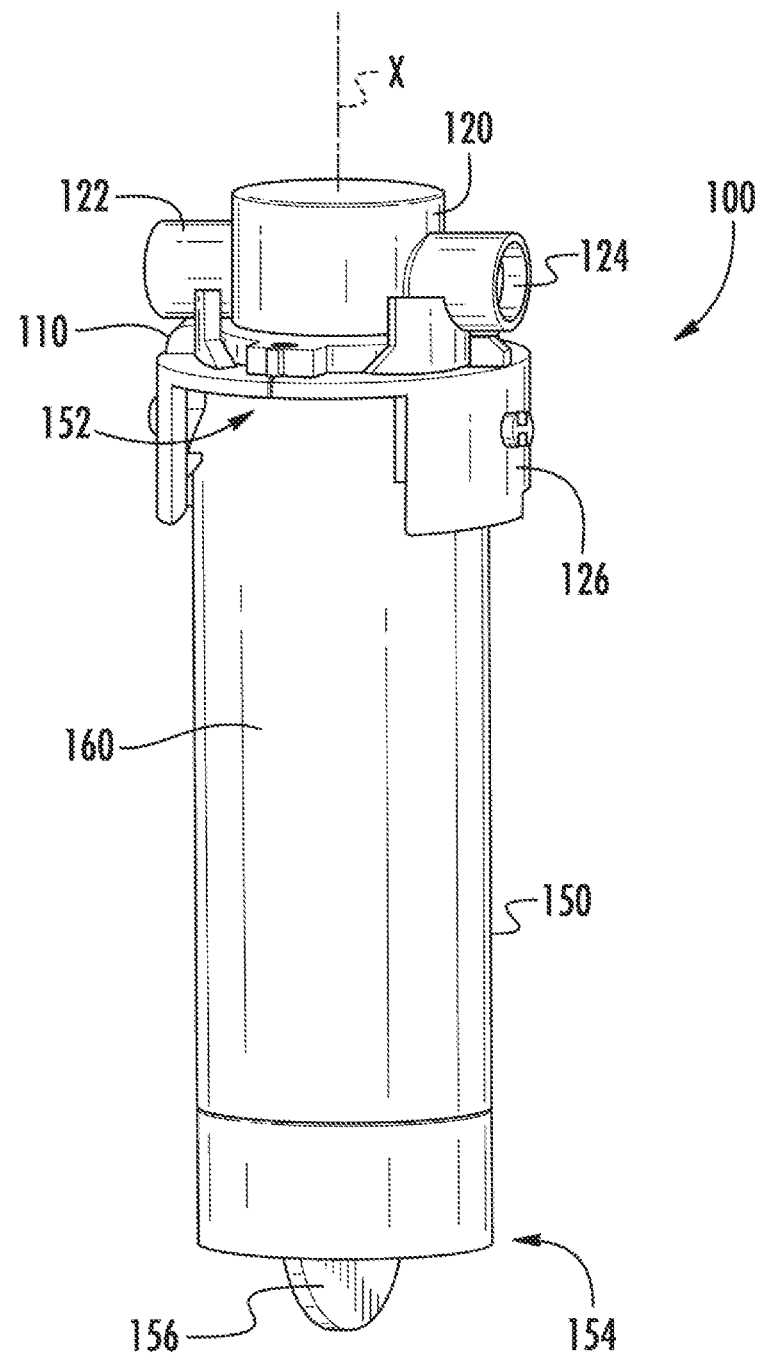
FIG. 3 provides a perspective view of a filter assembly according to an exemplary embodiment of the present subject matter.

FIG. 3 provides a perspective view of a filter assembly 100 according to an exemplary embodiment of the present subject matter. Filter assembly 100 may be utilized as a point of entry filter or a point of use filter. As an example, filter assembly 100 may be utilized in refrigerator appliance 10 as filter assembly 60. Thus, filter assembly 100 is described in greater detail below in the context of refrigerator appliance 10. In alternative exemplary embodiments, filter assembly 100 may be used in any other suitable appliance such as an ice maker, as a point of use water filtration system, e.g., installed beneath a sink, or as a point of entry water filtration system for an entire household. As discussed in greater detail below, filter assembly 100 includes features for assisting with changing a filter cartridge 150, e.g., without water leaking from a manifold 110.

As may be seen in FIG. 3, filter assembly 100 includes manifold 110 and filter cartridge 150. Filter cartridge 150 may be mounted to manifold 110 in order to filter water passing through manifold 110. As a filtering capacity of filter cartridge 150 decreases or at regular intervals, filter cartridge 150 may be changed in order to insure continuous, effective filtering of water flowing through manifold 110.

Figure 4:
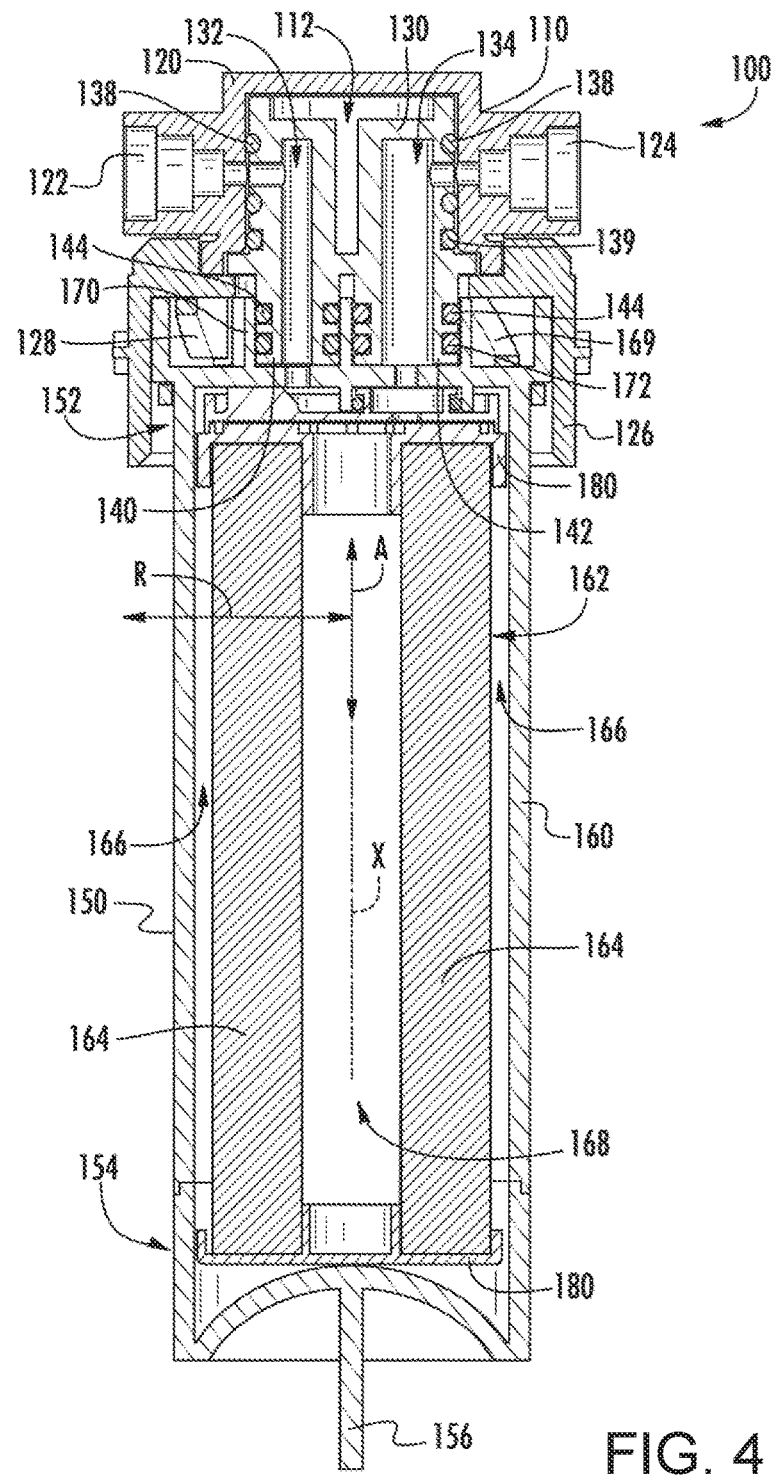
FIG. 4 provides a section view of the exemplary filter assembly of FIG. 3 with a spool valve of the exemplary filter assembly shown in an open configuration.
Figure 5:
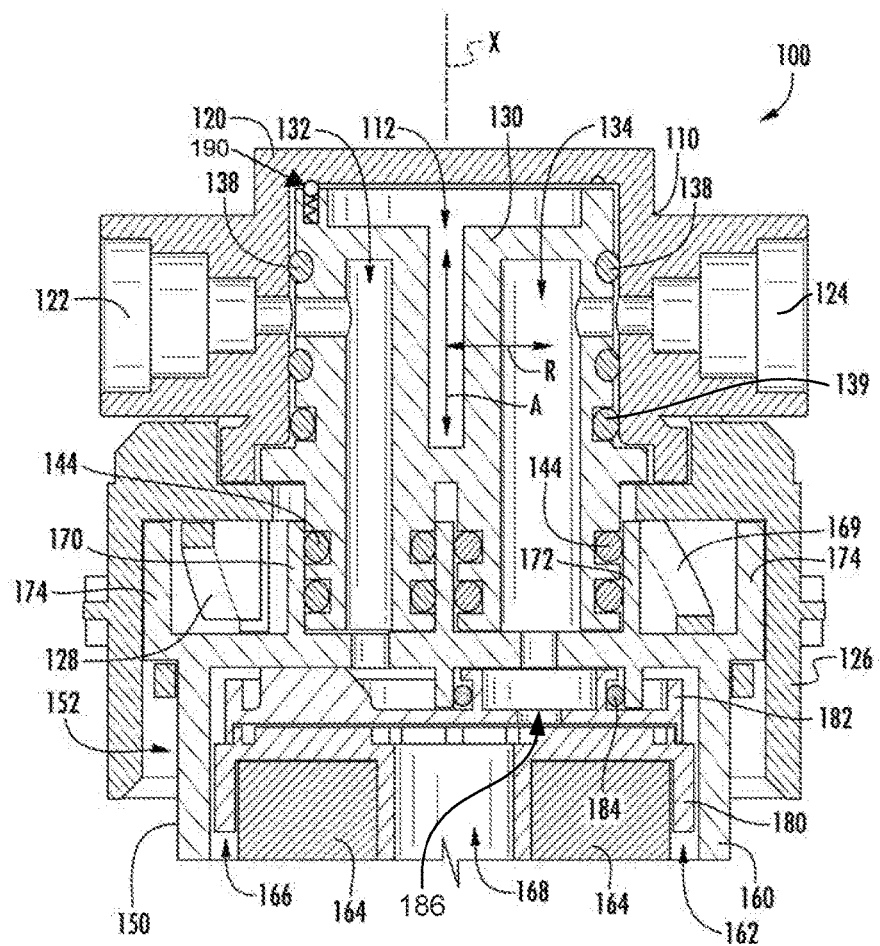
FIG. 5 provides a partial, section view of the exemplary filter assembly of FIG. 4.
Figure 6:
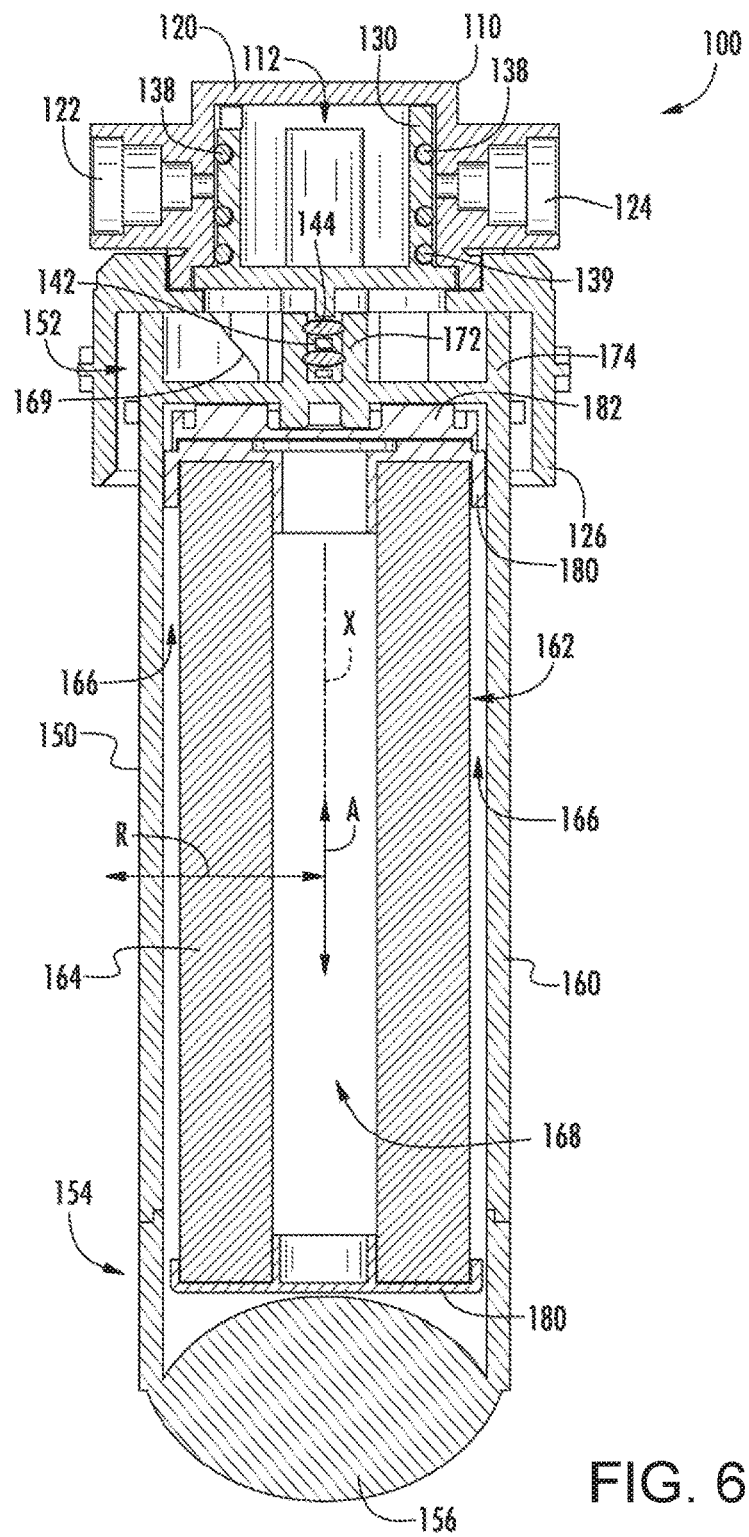
FIG. 6 provides a section view of the exemplary filter assembly of FIG. 3 with the spool valve of the exemplary filter assembly shown in a closed configuration.
Figure 7:
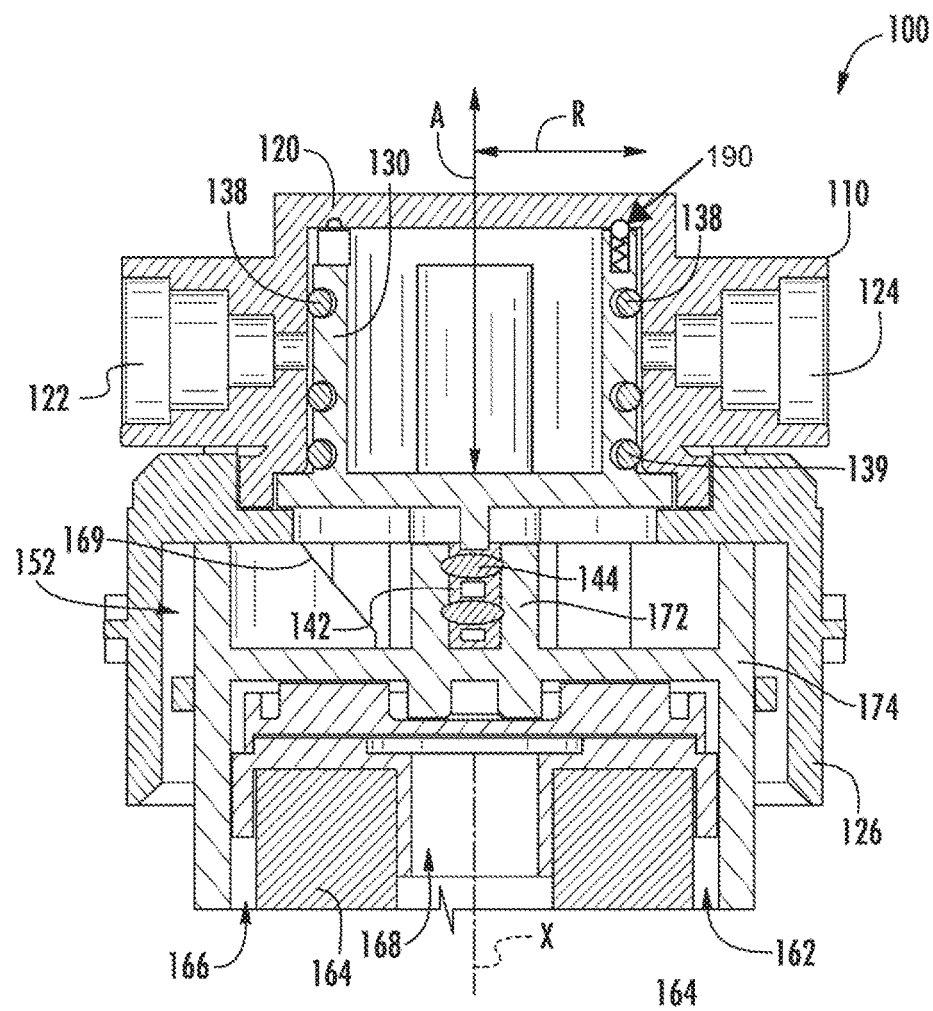
FIG. 7 provides a partial, section view of the exemplary filter assembly of FIG. 6.

FIG. 4 provides a section view of filter assembly 100, and FIG. 5 provides a partial, section view of filter assembly 100. In FIGS. 4 and 5, a spool valve 112 of filter assembly 100 is shown in an open configuration. In the open configuration, unfiltered water from manifold 110 may flow to filter cartridge 150, and filtered water may flow from filter cartridge 150 to manifold 110. FIG. 6 also provides a section view of filter assembly 100, and FIG. 7 provides another partial, section view of filter assembly 100. In FIGS. 6 and 7, spool valve 112 of filter assembly 100 is shown in a closed configuration. In the closed configuration, spool valve 112 blocks or limits unfiltered water from manifold 110 from flowing to filter cartridge 150, and spool valve 112 also blocks filtered water from flowing from filter cartridge 150 to manifold 110. Various features of filter assembly 100 are discussed in greater detail below in the context of FIGS. 4 through 7. Filter assembly 100 defines an axial direction A and a radial direction R that are perpendicular to each other.

As may be seen in FIGS. 4 through 7, manifold 110 includes spool valve 112 that regulates water flow from manifold 110 through filter cartridge 150. Spool valve 112 includes a housing 120, a spool body 130, a male inlet port 140 and a male outlet port 142. Housing 120 of spool valve 112 includes an inlet conduit 122 and an outlet conduit 124. Inlet conduit 122 may be coupled to a pressurized water supply, such as a municipal water supply or well, and unfiltered water may enter filter assembly 100 at inlet conduit 122 of housing 120. Outlet conduit 124 may receive filtered water from filter cartridge 150 and direct such filtered water out of filter assembly 100, e.g., to a faucet, water dispenser, ice maker, etc. Thus, components downstream of outlet conduit 124 that are fluidly coupled to filter assembly 100 may receive filtered water from filter assembly 100. A bracket 126 may assist with coupling housing 120 to a wall of refrigerator appliance 10 or any other suitable structure. As an example, bracket 126 may be fastened to the wall with screws, nails, etc. that extend through bracket 126 into the wall.

Spool body 130 is received in housing 120. In particular, spool body 130 is received in housing 120 such that spool body 130 is rotatable relative to housing 120 on an axis of rotation X. The axis of rotation X of spool body 130 may be parallel to the axial direction A. By rotating spool body 130 within housing 120, spool valve 112 may be actuated between the open and closed configurations, as discussed in greater detail below. As an example, spool body 130 may rotate by ninety degrees on the axis of rotation X in housing 120 between the open and closed configurations. Thus, spool body 130 is shown rotated by ninety degrees on the axis of rotation X in housing 120 from the open configuration (FIGS. 4 and 5) and the closed configuration (FIGS. 6 and 7), in the exemplary embodiment shown in FIGS. 4 through 7.

Male inlet port 140 and male outlet port 142 are mounted to or on spool body 130. For example, male inlet port 140 and male outlet port 142 may be integrally formed with spool body 130. Thus, spool body 130, male inlet port 140 and male outlet port 142 may be integrally formed of or with a single, continuous piece of material, such as molded plastic. Male inlet port 140 and male outlet port 142 may be mounted to or on spool body 130 such that male inlet port 140 and male outlet port 142 extend from spool body 130 along the axial direction A from spool body 130. Male inlet port 140 and male outlet port 142 may also be spaced apart or offset from each other along the radial direction R on spool body 130.

As discussed above, filter cartridge 150 is selectively mountable to manifold 110. Filter cartridge 150 includes a casing 160 that extends between a first end portion 152 and a second end portion 154, e.g., along the axial direction A. Casing 160 may be a cylindrical casing, e.g., such that casing 160 has a circular cross-section in a plane that is perpendicular to the axial direction A. A filter medium 164 is disposed within casing 160, e.g., within a chamber 162 defined by casing 160. Filter medium 164 divides chamber 162 into an unfiltered volume 166 and a filtered volume 168. As an example, unfiltered volume 166 may extend around filtered volume 168, and water may flow through filter medium 164 along the radial direction R from unfiltered volume 166 to filtered volume 168. Filter medium 164 removes impurities and contaminants from water passing through filter medium 164 from unfiltered volume 166 to filtered volume 168. Filter medium 164 may include any suitable mechanism for filtering water such as, e.g., ceramic filters, activated carbon filters, polymer filters, or reverse osmosis filters. In particular, filter medium 164 may be a hollow, cyclical block of activated carbon.

As used herein, the term "unfiltered" describes fluid that is not filtered relative to filter medium 164, and the term "filtered" describes fluid that is filtered relative to filter medium 164. Thus, the term "unfiltered volume" describes a volume within chamber 162 that is not filtered relative to filter medium 164, and the term "filtered volume" describes a volume within chamber 162 that is filtered relative to filter medium 164. However, as will be understood, filter assembly 100 (or an associated appliance, such as refrigerator appliance 10) may include additional filters that filter water entering chamber 162. Thus, "unfiltered volume" may be filtered relative to other filters but not filter medium 164.

Filter cartridge 150 also includes a female inlet port 170 and a female outlet port 172. Female inlet port 170 and female outlet port 172 are mounted to casing 160, e.g., at first end portion 152 of casing 160. As an example, female inlet port 170 and female outlet port 172 may be integrally formed with casing 160 such that casing 160, female inlet port 170 and female outlet port 172 are constructed of or with a single, continuous piece of material, such as molded plastic. Female inlet port 170 is sized and positioned on filter cartridge 150 to receive male inlet port 140 of manifold 110 when filter cartridge 150 is mounted to manifold 110. Similarly, female outlet port 172 is sized and positioned on filter cartridge 150 to receive male outlet port 142 of manifold 110 when filter cartridge 150 is mounted to manifold 110. Thus, to correspond to male inlet port 140 and male outlet portion 142, female inlet port 170 and female outlet port 172 (e.g., central axes of female inlet port 170 and female outlet port 172) may be spaced apart from each other along the radial direction R on casing 160.

Unfiltered water may flow from manifold 110 into filter cartridge 150 via the connection or coupling between male inlet port 140 of manifold 110 and female inlet port 170 of filter cartridge 150, and filtered water may flow from filter cartridge 150 to manifold 110 via the connection or coupling between male outlet port 142 of manifold 110 and female outlet port 172 of filter cartridge 150. In particular, as may be seen in FIGS. 4 and 5, when spool valve 112 is in the open configuration, an inlet passage 132 of spool body 130 extends between inlet conduit 122 of housing 120 and male inlet port 140 of manifold 110 such that inlet conduit 122 of housing 120 and male inlet port 140 of manifold 110 are in fluid communication with each other via inlet passage 132 of spool body 130. Similarly, an outlet passage 134 of spool body 130 extends between outlet conduit 124 of housing 120 and male outlet port 142 of manifold 110 when spool valve 112 is in the open configuration such that outlet conduit 124 of housing 120 and male outlet port 142 of manifold 110 are in fluid communication with each other via outlet passage 134 of spool body 130. In contrast, as may be seen in FIGS. 6 and 7, when spool valve 112 is in the closed configuration, inlet passage 132 of spool body 130 does not extend between inlet conduit 122 of housing 120 and male inlet port 140 of manifold 110. Thus, inlet conduit 122 of housing 120 and male inlet port 140 of manifold 110 are not in fluid communication with each other via inlet passage 132 of spool body 130 when spool valve 112 is in the closed configuration. Similarly, outlet passage 134 of spool body 130 does not extend between outlet conduit 124 of housing 120 and male outlet port 142 of manifold 110 when spool valve 112 is in the closed configuration. Thus, outlet conduit 124 of housing 120 and male outlet port 142 of manifold 110 are not in fluid communication with each other via outlet passage 134 of spool body 130 when spool valve 112 is in the closed configuration.

To shift spool valve 112 between the open and closed configurations, spool body 130 is rotatable within housing 120 with filter cartridge 150. For example, a user may grasp filter cartridge 150, e.g., at a fin or handle 156 positioned at second end portion 154 of casing 160, and rotate filter cartridge 150 such that spool body 130 which is coupled to filter cartridge 150 also rotates with filter cartridge 150. In such a manner, a user may adjust spool valve 112 between the open configuration (shown in FIGS. 4 and 5) and the closed configuration (shown in FIGS. 6 and 7) with filter cartridge 150. Handle 156 may be positioned opposite female inlet port 170 and female outlet port 172 on casing 160 along the axial direction A. Thus, filter medium 164 may be positioned between handle 156 and female inlet and outlet ports 170, 172 along the axial direction A within casing 160.

As may be seen in FIGS. 5 and 7, filter assembly 100 may also include a biasing mechanism 190. Biasing mechanism 190 may be a spring loaded ball or pin mounted to spool body 130 that engages a portion of housing 120 when spool valve 112 is in the open or closed configurations. In particular, as shown in FIGS. 5 and 7, the spring loaded ball on spool body 130 may be received within a first detent formed on housing 120 when spool valve 112 is in the open configuration (FIG. 5) and a second, separate detent when spool valve 112 is in the closed configuration (FIG. 7). Thus, housing 120 may define two detents with each detent positioned at a location on housing 120 corresponding to a respective one of the open and closed configurations of spool valve 112. In alternative exemplary embodiments, biasing mechanism 190 may positioned at any other suitable location. For example, biasing mechanism 190 may be mounted to housing 120 while the detents are formed on spool body 130.

Biasing mechanism 190 may assist with maintaining spool valve 112 is in the open or closed configurations and/or with providing tactile feedback to a user of filter assembly 100 when spool valve 112 adjusting between the open and closed configurations. For example, a user may have to apply more force to rotate spool valve 112 from the open or closed configurations when filter assembly 100 includes biasing mechanism 190 compared to when filter assembly 100 does not include biasing mechanism 190. As another, example, the user may feel the spring loaded ball extend into the detent on spool body 130 and the user may thereby know that the spool valve 112 is fully rotated to either the open configuration or the closed configuration.

Figure 8:
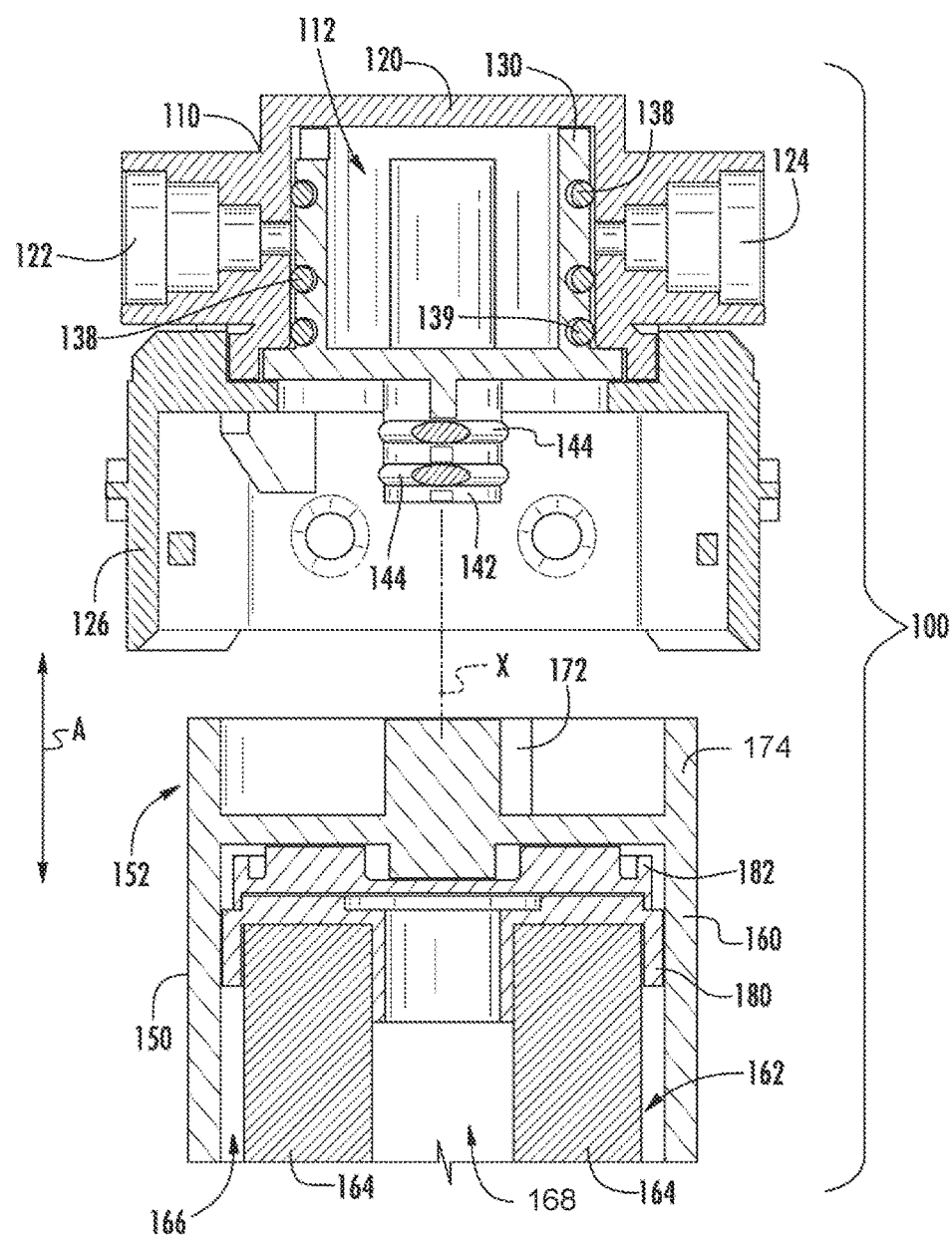
FIG. 8 provides a partial, section view of the exemplary filter assembly of FIG. 7 with the filter cartridge shown spaced apart from a manifold of the exemplary filter assembly.

FIG. 8 provides a partial, section view of filter assembly 100 with filter cartridge 150 shown spaced apart from manifold 110. As may be seen in FIG. 8, filter cartridge 150 may be removed or disconnected from manifold 110 when spool valve 112 is in the closed configuration. Thus, when spool valve 112 stops fluid flow from manifold 110 into filter cartridge 150, filter cartridge 150 may be conveniently removed from manifold 110, e.g., to facilitate cleaning or replacement of filter cartridge 150.

Figure 9:
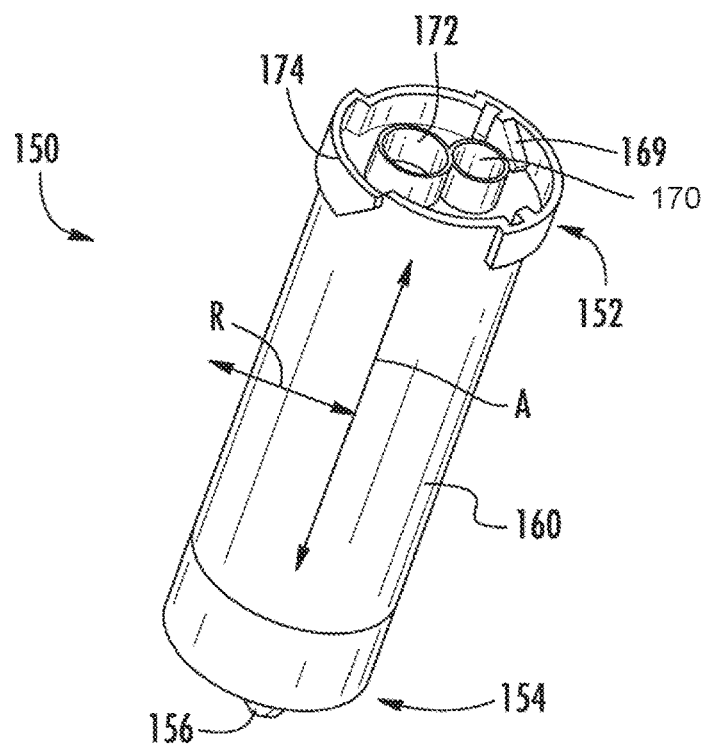
FIG. 9 provides a perspective view of the filter cartridge of the exemplary filter assembly of FIG. 3.
Figure 10:
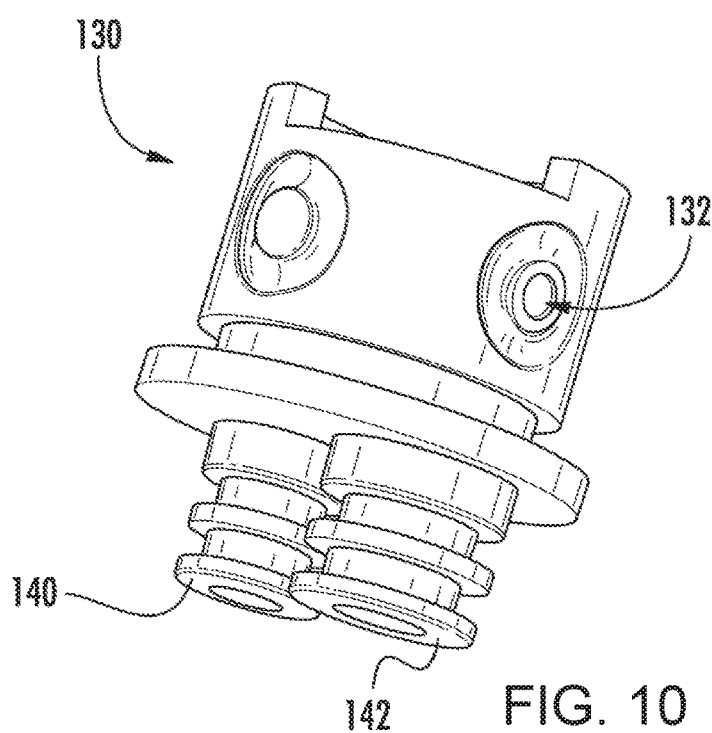
FIG. 10 provides a perspective view of a spool body of the spool valve of the exemplary filter assembly of FIG. 3.

FIG. 9 provides a perspective view of filter cartridge 150. The connection between manifold 110 and filter cartridge 150 may facilitate rotation of spool body 130 with filter cartridge 150. For example, as shown in FIG. 10, male inlet port 140 and male outlet port 142 of manifold 110 may be offset from the axis of rotation X of spool body 130 along the radial direction R on spool body 130. Thus, a moment or torque applied by a user to filter cartridge 150 may be more uniformly applied to spool body 130 relative to filter cartridges having inlets and/or outlets that are coaxial with an axis of rotation. As a particular example, male inlet port 140 and male outlet port 142 of manifold 110 may be positioned equidistant from the axis of rotation X of spool body 130 along the radial direction R on spool body 130. In particular, a centroid of male inlet port 140 (e.g., in a plane that is perpendicular to the axial direction A) and a centroid of male outlet port 142 of manifold 110 (e.g., in the plane that is perpendicular to the axial direction A) may be positioned equidistant from the axis of rotation X of spool body 130 along the radial direction R on spool body 130. Such positioning of male inlet port 140 and male outlet port 142 on spool body 130 may facilitate rotation of spool body 130 with filter cartridge 150.

Figure 11:
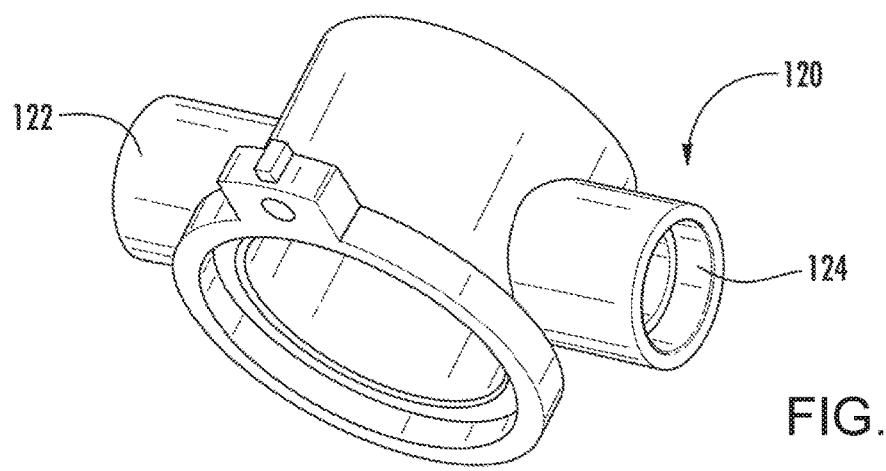
FIG. 11 provides a perspective view of a housing of the spool valve of the exemplary filter assembly of FIG. 3.
Figure 12:
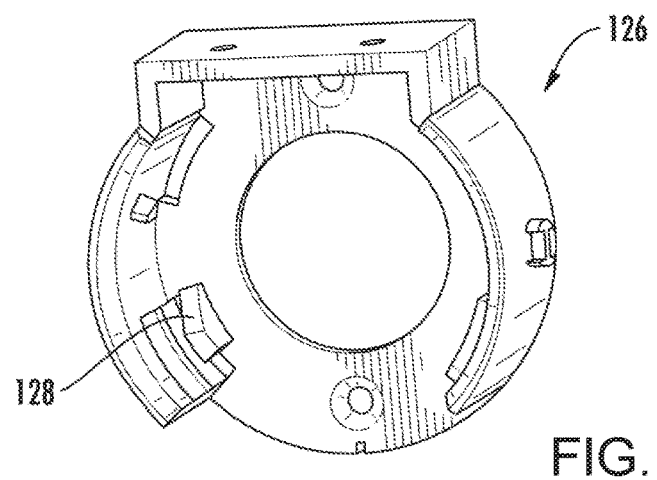
FIG. 12 provides a perspective view of a bracket of the spool valve of the exemplary filter assembly of FIG. 3.

FIG. 10 provides a perspective view of spool body 130 of spool valve 112. FIG. 11 provides a perspective view of housing 120 of spool valve 112. FIG. 12 provides a perspective view of bracket 126 of spool valve 112. Various features of filter assembly 100 are discussed in greater detail below in the context of FIGS. 10 through 12.

Turning now to FIGS. 9 and 10, filter assembly 100 includes features to assist with positioning filter cartridge 150 on manifold 110 such that male inlet port 140 is received within female inlet port 170 while male outlet port 142 is received within female outlet port 172, e.g., and not vice versa. In particular, male inlet port 140 may be keyed or sized to female inlet port 170 while male outlet port 142 is keyed or sized to female outlet port 172. For example, male inlet port 140 and male outlet port 142 may have different cross-sectional areas, e.g., in a plane that is perpendicular to the axial direction A, and female inlet port 170 may not be complementary to male outlet port 142 while female outlet port 172 may not be complementary to male inlet port 140. As a particular example, male inlet port 140 and female inlet port 170 may be smaller than male outlet port 142 and female outlet port 172, respectively, as shown in FIG. 10. Thus, filter assembly 100 may include features that poka-yoke the connection between filter cartridge 150 on manifold 110 to insure that male inlet port 140 is received within female inlet port 170 while male outlet port 142 is received within female outlet port 172.

Filter assembly 100 also includes various seals, rings and/or gaskets for containing water flow within and/or out of filter assembly 100. For example, as shown in FIGS. 5 and 7, manifold 110 includes a plurality of O-rings 144. Respective O-rings 144 are disposed on each of male inlet port 140 and male outlet port 142 of manifold 110. Thus, some of O-rings 144 extend between male inlet port 140 and female inlet port 170 when filter cartridge 150 is mounted to manifold 110, and others of O-rings 144 extend between male outlet port 142 and female outlet port 172 when filter cartridge 150 is mounted to manifold 110. In such a manner, O-rings 144 may limit leakage of water from filter assembly 100 at the fluid inlet and outlet connections between manifold 110 and filter cartridge 150. In such exemplary embodiments, filter cartridge 150 need not include O-rings mounted to female inlet port 170 and/or female outlet port 172. In such a manner, a cost of replacement filter cartridges may be reduced and potential damage to exposed O-rings may be limited as well.

Filter assembly 100 also includes an axial seal 139 that extends between housing 120 and spool body 130 along the radial direction R. Axial seal 139 limits or blocks fluid flow out of filter assembly 100 via a gap between housing 120 and spool body 130. Filter assembly 100 further includes face seals 138 that extend between housing 120 and spool body 130 along the radial direction R. Face seal 138 may be spaced apart from one another on spool body 130 by ninety-degrees and may also be mounted to spool body 130 such that face seals 138 rotate with spool body 130. Respective face seals 139 may be positioned at and extend around inlet passage 132 and outlet passage 134 on an outer surface of spool body 130, and other face seals 138 may be positioned between inlet passage 132 and outlet passage 134 on the outer surface of spool body 130. Face seals 138 may limit fluid flow into and/or out of inlet passage 132 and outlet passage 134 into a gap between housing 120 and spool body 130.

Turning now to FIG. 9, filter cartridge 150 may include an outer wall 174, e.g., that extends from casing 160 along the axial direction A. As an example, outer wall 174 may be integrally formed with casing 160 such that casing 160 and outer wall 174 are constructed of or with a single continuous piece of material, such as molded plastic. Outer wall 174 is positioned at or adjacent first end portion 152 of casing 160 and may extend around female inlet port 170 and female outlet port 172 on filter cartridge 150. Thus, female inlet port 170 and female outlet port 172 may be disposed within outer wall 174 along the radial direction R. Outer wall 174 may protect or shield female inlet port 170 and female outlet port 172. For example, if filter cartridge 150 is dropped, outer wall 174 may impact a surface rather than female inlet port 170 and female outlet port 172. In such manner, damage to fluid connections of filter cartridge 150 may be limited.

With reference to FIGS. 9 and 12, filter cartridge 150 may include ramps 169 (FIG. 9), and bracket 126 may also include ramps 128 (FIG. 12). As spool valve 112 shifts between the open and closed configurations, ramps 128 of bracket 128 may engage ramps 169 of filter cartridge 150 to assist with decoupling filter cartridge 150 from manifold 110. For example, as filter cartridge 150 is rotated relative housing 120, ramps 169 of filter cartridge 150 may slide on ramps 128 of bracket 128 such that filter cartridge 150 is urged away from housing 120 along the axial direction A.

Turning back to FIGS. 4 and 5, filter cartridge 150 also includes a pair of end caps 180. Caps 180 are mounted to filter medium 164. In particular, caps 180 are positioned at opposite ends of filter medium 164 along the axial direction A. Caps 180 can be mounted to filter medium 164 using any suitable method or mechanism. For example, caps 180 may be mounted to filter medium 164 using glue, compression fit, over-molding, ultrasonic welding, etc. Caps 180 can assist with separating unfiltered volume 166 from filtered volume 168 and thereby restrict fluid flow between unfiltered volume 166 and filtered volume 168 through filter medium 164.

The one of caps 180 at first end portion 152 of casing 160 defines an outlet for water from filtered volume 168 of casing 160. For example, water filtered by filter medium 164 can exit filtered volume 168 through the one of caps 180 at first end portion 152 of casing 160. A top plate 182 is also positioned at first end portion 152 of casing 160, e.g., over the one of caps 180 at first end portion 152 of casing 160. Top plate 182 includes an O-ring 184 that engages or meshes with casing 160 adjacent female outlet port 172. Top plate 182 and O-ring 184 can assist caps 180 with separating unfiltered volume 166 from filtered volume 168 and thereby restrict fluid flow between unfiltered volume 166 and filtered volume 168 through filter medium 164. O-ring 184 may be offset from a central axis of filtered volume 168 along the radial direction R. Thus, water may flow out of filtered volume 168 via an outlet offset from the central axis of filtered volume 168 along the radial direction R.

The position of end cap 180 and top plate 182 may be selected to permit the flow of filtered liquid from filtered volume 168 via female outlet port 172. For example, top plate 182 defines an opening or outlet 186 that extends through top plate 182. O-ring 184 may extend around outlet 186 of top plate 182. Outlet 186 of top plate 182 is contiguous or in fluid communication with filtered volume 168 within filtered medium 164. Thus, filtered liquid exiting filter cartridge 150 at female outlet port 172 flows through outlet 186 of top plate 182 between filtered volume 168 within filtered medium 164 and female outlet port 172. As shown in FIG. 5, outlet 186 of top plate 182 is offset from the central axis of casing 160, which corresponds to the axis of rotation X in the exemplary embodiment shown in FIGS. 4-7, along the radial direction R and is aligned with female outlet port 172. In such a manner, outlet 186 of top plate 182 places filtered volume 168 within filtered medium 164 in fluid communication with female outlet port 172, e.g., despite female outlet port 172 being offset from the central axis of casing 160 (or filter medium 164 within casing 160) along the radial direction R.

Figure 13:
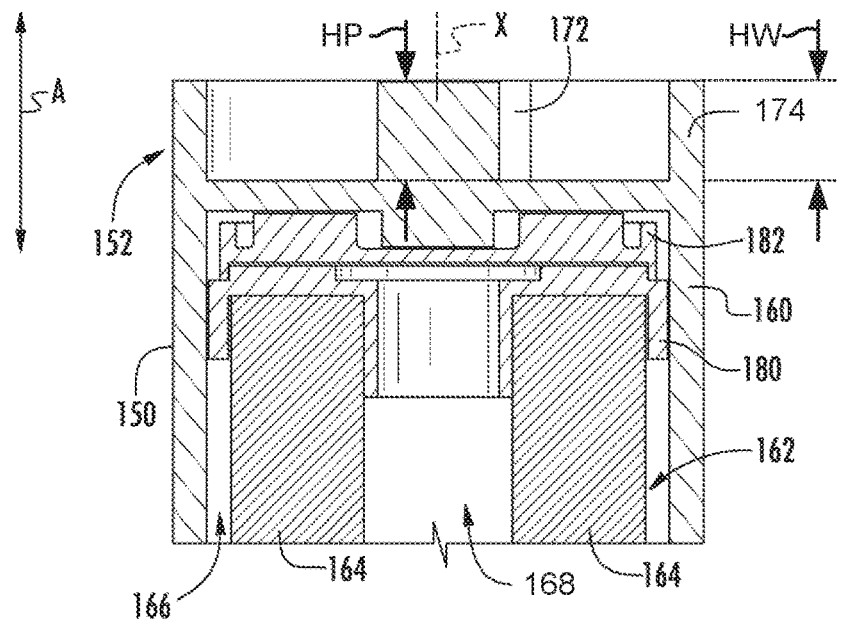
FIG. 13 provides a partial, section view the filter cartridge of the exemplary filter assembly of FIG. 3.
Figure 14:
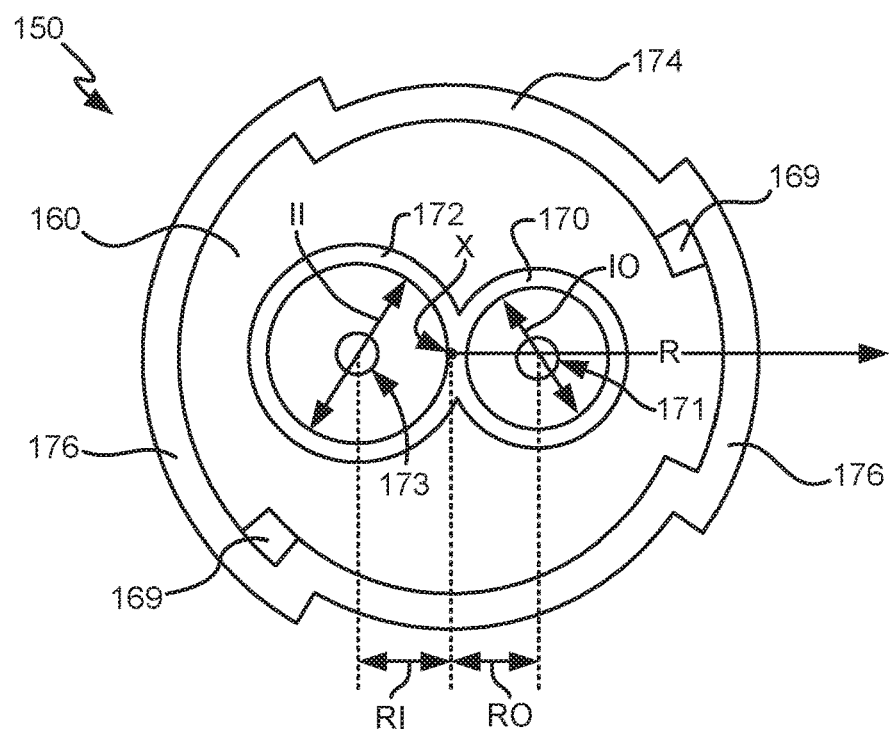
FIG. 14 provides a top, plan view of the filter cartridge of the exemplary filter assembly of FIG. 3.

FIG. 13 provides a partial, section view filter cartridge 150. FIG. 14 provides a top, plan view of filter cartridge 150. As discussed in greater detail below in the context of FIGS. 13 and 14, various components of filter cartridge 150 are sized and shaped to facilitate engagement of filter cartridge 150 with manifold 110. Further, various components of filter cartridge 150 are sized and shaped to protect female inlet port 170 and/or female outlet port 172.

Casing 160 (or filter medium 164 within casing 160) may have a central axis that is parallel to the axial direction A. In the exemplary embodiment shown in FIGS. 13 and 14, the central axis of casing 160 corresponds to the axis of rotation X. As shown in FIG. 14, female inlet port 170 and female outlet port 172 are offset from the central axis of the casing 160 along the radial direction R. In such a manner, female inlet port 170 and female outlet port 172 may be positioned on casing 160 to receive male inlet port 140 and male outlet port 142 of manifold 110, respectively. Female inlet port 170 and female outlet port 172 may be offset from the central axis of the casing 160 along the radial direction R by any suitable amount. For example, as shown in FIG. 14, a centroid of female inlet port 170 in a plane that is perpendicular to the axial direction A is offset from the central axis of the casing 160 along the radial direction R by a distance RI, and a centroid of female outlet port 172 in the plane that is perpendicular to the axial direction A is offset from the central axis of casing 160 by a distance RO. The distance RI and the distance RO may be no less than a quarter of an inch and no more than three inches. Such sizing of the radial offset from the central axis of the casing 160 can facilitate rotation of spool valve 112 between the open and closed configurations via the connections between male inlet port 140/female inlet port 170 and male outlet port 142/female outlet port 172. In certain exemplary embodiments, the distance RI and the distance RO may be about the same. As used herein, the term "about" means within half an inch of the stated distance when used in the context of radial distances. In alternative exemplary embodiments, the distance RI and the distance RO may be different.

As may be seen in FIG. 13, outer wall 174 defines a height HW, e.g., along the axial direction A. Similarly, female inlet port 170 and female outlet port 172 each define a height HP, e.g., along the axial direction A. In the exemplary embodiment shown in FIG. 13, female inlet port 170 and female outlet port 172 have a common height. However, female inlet port 170 and female outlet port 172 may have different heights in alternative exemplary embodiments. The height HW of outer wall 174 may be no less than the height HP of female inlet port 170 and female outlet port 172. In such a manner, outer wall 174 may protect or shield female inlet port 170 and female outlet port 172. The height HW of outer wall 174 may be any suitable height. For example, the height HW of outer wall 174 may be no greater than an inch and no less than an eighth of an inch. In such a manner, outer wall 174 may extend from casing 160 along the axial direction A by no less than an inch and no more than an eighth of an inch to protect female inlet port 170 and female outlet port 172 in certain exemplary embodiments.

Turning now to FIG. 14, outer wall 174 may extend around female inlet port 170 and female outlet port 172, e.g., in a plane that is perpendicular to the axial direction A. For example, outer wall 174 may extend continuously around female inlet port 170 and female outlet port 172 in a plane that is perpendicular to the axial direction A, as shown in FIG. 14. As another example, outer wall 174 may include multiple segments that are separated from each other along a perimeter of the casing 160 but collectively extend around female inlet port 170 and female outlet port 172.

As may be seen in FIG. 14, female inlet port 170 and female outlet port 172 are circular and each defines an inner diameter, inner diameter II of female inlet port 170 and inner diameter IO of female outlet port 172. The inner diameter II of female inlet port 170 may be at least ten percent greater or less than the inner diameter IO of female outlet port 172. In such a manner, female inlet port 170 and female outlet port 172 may have different sizes to ensure proper engagement of filter cartridge 150 with manifold 110, as discussed above.

Filter cartridge 150 may also include ledges or lugs 176. As shown in FIG. 14, two lugs 176 are formed with the outer wall 174 that extend radially outwardly relative to an outer surface of the casing 160 for releasably securing the filter cartridge 150 to the manifold 110. Lugs 176 may be positioned at or formed with outer wall 174, e.g., such that lugs 176 extend over and/or are cantilevered from casing 160. Lugs 176 engage manifold when spool valve 112 is in the closed configuration in order to mount filter cartridge 150 to manifold 110. In particular, lugs 176 may contact and engage bracket 126 when spool valve 112 in in the closed configuration such that the lugs 176 limit or prevent movement of filter cartridge 150 relative to manifold 110 along the axial direction A when spool valve 112 in in the closed configuration. Filter cartridge 150 may be mounted to manifold 110 using any other suitable method or mechanism in alternative exemplary embodiments.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A filter cartridge defining an axial direction and a radial direction that are perpendicular to each other, the filter cartridge comprising:
   a casing;
   a filter medium disposed within the casing; and
   a female inlet port and a female outlet port mounted to the casing at an end portion of the casing, the female inlet port offset from the female outlet port along the radial direction at the end portion of the casing, wherein the casing is a cylindrical casing having a central axis parallel to the axial direction, the female inlet port and the female outlet port offset from the central axis of the casing along the radial direction, an outer wall mounted to the casing at the end portion of the casing, the outer wall extending around the female inlet port and the female outlet port in a plane that is perpendicular to the axial direction, and at least two lugs formed with the outer wall that extend radially outwardly relative to an outer surface of the casing for releasably securing the filter cartridge to a manifold.

2. The filter cartridge of claim 1, wherein the female inlet port and the female outlet port do not include an O-ring.

3. The filter cartridge of claim 1, wherein the female inlet port and the female outlet port are equidistant from the central axis of casing along the radial direction.

4. The filter cartridge of claim 1, wherein a centroid of the female inlet port in a plane that is perpendicular to the axial direction and a centroid of the female outlet port, in the plane that is perpendicular to the axial direction are offset from the central axis of the casing by no less than a quarter of an inch and no more than three inches along the radial direction.

5. The filter cartridge of claim 1, wherein an opening of the female inlet port and an opening of the female outlet port have different cross-sectional areas in a plane that is perpendicular to the axial direction.

6. The filter cartridge of claim 5, wherein the opening of the female inlet port and the opening of the female outlet port are circular and each define an inner diameter, the inner diameter of the female inlet port is at least ten percent greater or less than the inner diameter of the female outlet port.

7. The filter cartridge of claim 1, wherein a size of an opening of the female inlet port is different than a size of an opening of the female outlet port in a plane that is perpendicular to the axial direction.

8. The filter cartridge of claim 1, further comprising a handle mounted to the casing opposite the female inlet port and the female outlet port.

9. The filter cartridge of claim 1, wherein the outer wall, the female inlet port and the female outlet port each define a height along the axial direction, the height of the outer wall being no less than the height of the female inlet poll, and the height of the female outlet port.

10. The filter cartridge of claim 9, wherein the height of the outer wall is no greater than an inch and no less than an eighth of an inch.

11. The filter cartridge of claim 1, wherein the filter medium comprises a carbon block, an end cap and a top plate, the carbon block defining a central axis that is parallel to the axial direction, the end cap positioned on and mounted to the carbon block at an end portion of the carbon block, the top plate positioned on and mounted to the end cap, the top plate.

12. A filter cartridge defining an axial direction and a radial direction that are perpendicular to each other, the filter cartridge comprising:
a cylindrical casing having a central axis that is parallel to the axial direction; a filter medium disposed within the cylindrical casing;
a female inlet port and a female outlet port mounted to the casing at an end portion of the casing, the female inlet port and the female outlet port offset from each other along the radial direction, the female inlet port and the female outlet port also offset from the central axis of the easing along the radial direction, the female inlet port and the female outlet port positioned equidistant from the central axis of casing along the radial direction; and
an outer wall mounted to the casing at the end portion of the easing, the outer wall extending around the female inlet port and the female outlet port in a plane that is perpendicular to the axial direction,
wherein the outer wall, the female inlet port and the female outlet port each define a height along the axial direction, the height of the outer wall being no less than the height of the female inlet port and the height of the female outlet port, and
and at least two lugs formed with the outer wall that extend radially outwardly relative to an outer surface of the casing for releasably securing the filter cartridge to a manifold.

13. The filter cartridge of claim 12, wherein a centroid of the female inlet port in a plane that is perpendicular to the axial direction and a centroid of the female outlet port in the plane that is perpendicular to the axial direction are offset from the central axis of the casing by no less than a quarter of an inch and no more than three inches along the radial direction.

14. The filter cartridge of claim 12, wherein an opening of the female inlet port and an opening of the female outlet port have different cross-sectional areas in a plane that is perpendicular to the axial direction.

15. The filter cartridge of claim 14, wherein the opening of the female inlet port and the opening of the female outlet port are circular and each define an inner diameter, the inner diameter of the female inlet port is at least ten percent greater or less than the inner diameter of the female outlet port.

16. The filter cartridge of claim 12, further comprising a handle mounted to the casing opposite the female inlet port and the female outlet port.

17. The filter cartridge of claim 12, wherein the height of the outer wall is no greater than an inch and no less than an eighth of an inch.

18. The filter cartridge of claim 12, wherein the filter medium comprises a carbon block, an end cap and a top plate, the carbon block defining a central axis that is parallel to the axial direction, the end cap positioned on and mounted to the carbon block at an end portion of the carbon block, the top plate positioned on and mounted to the end cap, the top plate defining an outlet that is in fluid communication with a filtered volume within the carbon block, the outlet of the top plate offset from the central axis of the carbon block and aligned with the female outlet port.

19. A filter cartridge defining an axial direction and a radial direction that are perpendicular to each other, the filter cartridge comprising;
a casing;
a filter medium disposed within the casing; and
a female inlet port and a female outlet port mounted to the casing at an end portion of the casing, the female inlet port offset from the female outlet port along the radial direction at the end portion of the casing,
wherein the filter medium comprises a carbon block, an end cap and a top plate, the carbon block defining a central axis that is parallel to the axial direction, the end cap positioned on and mounted to the carbon block at an end portion of the carbon block, the top plate positioned on and mounted to the end cap, the top plate defining an outlet that is in fluid communication with a filtered volume within the carbon block, the outlet of the top plate offset from the central axis of the carbon block and aligned with the female outlet port.

* * * * *